Dec. 13, 1955  A. N. STANTON  2,727,142
WAVE SHAPING CIRCUIT
Filed Feb. 19, 1951  2 Sheets-Sheet 1

INVENTOR.
AUSTIN N. STANTON
BY *Walter J. Gagnon*
ATTORNEY

Dec. 13, 1955  A. N. STANTON  2,727,142
WAVE SHAPING CIRCUIT
Filed Feb. 19, 1951  2 Sheets-Sheet 2

INVENTOR.
AUSTIN N. STANTON
BY
ATTORNEY

United States Patent Office 2,727,142
Patented Dec. 13, 1955

2,727,142

WAVE SHAPING CIRCUIT

Austin N. Stanton, Garland, Tex.

Application February 19, 1951, Serial No. 211,769

9 Claims. (Cl. 250—27)

This invention relates to electric control circuits and more particularly to such control circuits for energizing an output circuit with alternating current of predetermined wave form from an input circuit supplying alternating current of irregular wave form.

In many applications an alternating current of a predetermined wave form, is necessary although the available alternating current is of irregular wave form. It is necessary therefore to improve the wave form of the available alternating current before utilizing it in the desired application.

Accordingly it is an object of my invention to provide a new and improved electric control circuit for improving the wave form of alternating current of irregular wave form.

It is another object of my invention to provide a new and improved control circuit having electric discharge means whose conductivity is varied in accordance with the departure of an alternating current from sine wave form.

It is still another object of my invention to provide a new and improved control circuit having electric discharge means upon whose control members is impressed a potential which varies in accordance with the difference between a sine wave form and the irregular wave form alternating current of an alternating current circuit.

Briefly stated, in one embodiment of my new and improved control circuit a pair of electric discharge devices are reversely connected in parallel between an input circuit energized by an alternating current of irregular wave form and an alternating current output circuit in which the alternating current must be of regular wave form. A resonant circuit is connected across said output circuit and produces an alternating potential of substantially sine wave form. The sine wave alternating potential is algebraically added to a potential having the same wave form as the alternating voltage of the output circuit. The sum of the two potentials induces alternating potentials of opposite polarites but like wave forms in separate windings of a transformer each of which is connected to the control member of one of the electric discharge devices in order to vary the conductivity of its associated electric discharge device in accordance with the departure of the alternating current of the input circuit from sine wave form.

In another embodiment of my invention, the algebraic sum of a sine wave potential and the potential having the same wave form as the output circuit voltage is amplified by an electric discharge device before being impressed on the control grids of the reversely connected in parallel electric discharge devices. The bias on the control grid of the amplifier electric discharge device is varied in accordance with the R. M. S. voltage of the output circuit by a voltage sensing circuit to maintaining the R. M. S. voltage of the output circuit constant.

In still another embodiment of my invention an oscillator of the regenerative type is employed to generate the alternating potential of substantially sine wave form which is added algebraically to the alternating potential which has the same wave form as the alternating voltage of the output circuit.

For a better understanding of my invention, reference may be had to the following description taken in connection with the accompanying drawing and its scope will be pointed out in the appended claims.

In the drawing, Figure 1 is a diagrammatic illustration of an embodiment of my invention:

Figure 1:
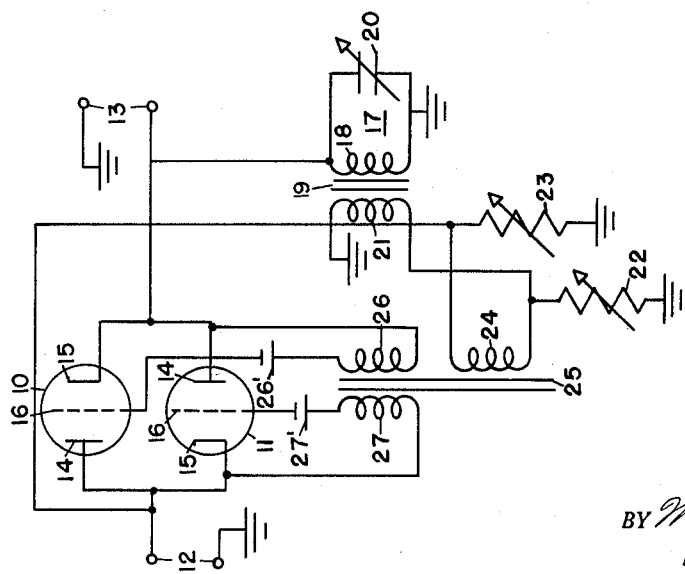

Referring now to Figure 1, a pair of electric discharge devices 10 and 11 are connected reversely in parallel between an input circuit 12 and an output circuit 13. Each of the electric discharge devices 10 and 11 is provided with an anode 14, a cathode 15 and a control grid 16, and is preferably of the high vacuum type. Anode 14 of electric discharge device 10 anode and cathode 15 of electric discharge device 11 are connected to one side of input circuit 12 while anode 14 of electric discharge device 11 and cathode 15 of electric discharge device 10 are connected to one side of output circuit 13 in order that both halves of the alternating current may be transmitted from circuit 12 to circuit 13, electric discharge device 10 being nonconductive when electric discharge device 11 is conductive and vice versa.

In order to provide an alternating potential of substantially sine wave form which has the same frequency and has the proper phase relationship with respect to the alternating voltage of output circuit 12, I provide a resonant circuit 17 comprising the primary winding 18 of a transformer 19 and a capacitor 20 connected in parallel across output circuit 13. Resonant circuit 17 is tuned to the frequency of the alternating current in circuits 12 and 13 and, as a result, resonant currents of sine wave form of the same frequency flow in primary winding 18 and induce an alternating voltage of sine wave form in secondary winding 21.

A pair of resistances 22 and 23 are connected in series across the primary winding 24 of a transformer 25. In order to cause an alternating voltage to appear in winding 24 which varies in accordance with the departure of the alternating voltage of input circuit 12 from sine wave form, resistance 23 is connected across input circuit 12 while resistance 22 is connected across secondary winding 21 of transformer 19. Winding 21 and input circuit 12 are connected to resistances 22 and 23 in such manner that the voltage appearing in winding 24 will be equal to the difference in the voltage across resistances 22 and 23. At any one instant, the voltage applied across resistance 22 from winding 21 will tend to cause a current to flow in one direction through winding 24 while the voltage applied across resistance 23 from input circuit 12 will tend to cause a current to flow in the opposite direction through winding 24. Since the voltage applied across resistance 22 is of sine wave form and since its amplitude is set by adjustment of variable resistance 22 never exceed the amplitude of the voltage across resistance 23, the voltage appearing across winding 24 will always be the difference between the voltage across resistance 23 and the voltage across resistance 22.

Figure 2:
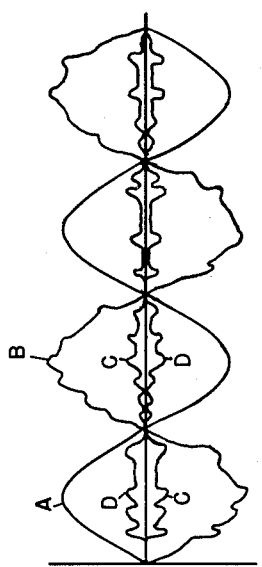
Figure 2 is a representation of the wave form of the potentials at various points in the circuit shown in Figure 1.

Figure 2 illustrates diagrammatically the relationships of the voltages. The line A indicates the sine wave voltage applied across resistance 22 by winding 21, the line B indicates the distorted wave form voltage applied across resistance 23 from input circuit 12. It will be readily apparent that line C is the algebraic sum of the voltages indicated by lines A and B.

In order to apply the voltage represented by line C on the control grids of electric discharge devices, I provide secondary windings 26 and 27 on transformer 25 which are connected to grids 16 of electric discharge devices 10 and 11, respectively. Windings 26 and 27 are oppositely wound to impress potentials of opposite polarities on the grids 16 whose wave forms are illustrated by lines C and D of Figure 2, and are so arranged that a negative potential is impressed on control grid 16 of the electric discharge device 10 or 11 which is transmitting current from input circuit 12 to output circuit 13 during a particular half cycle of the alternating current of input circuit 12. Bias batteries 26' and 27' are connected in series with windings 26 and 27 to provide proper operating bias.

The method of operation of the above described device will be apparent to those skilled in the art. Briefly, resonant circuit 17 is excited from output circuit 13 and induces an alternating voltage in winding 21 which is in phase with the alternating current of output circuit 13 and therefore of input circuit 12. Since resistance 23 is connected across input circuit 12, the alternating voltage across resistance 23 is in phase with the alternating voltage across resistance 22 and voltages of opposite polarities are equal to the algebraic sum of the voltages across resistances 22 and 23 and are induced in windings 26 and 27. The potential on each grid 11 will therefore vary in accordance with the departure from sine wave form of the voltage of input circuit 12. The conductivity of each of the electric discharge devices 10 and 11, during the half cycle each is conductive, therefore also varies in accordance with the departure from sine wave form of the voltage of input circuit 12. As a result, the voltage which appears across output circuit 13 is of sine wave form.

The apparatus diagrammatically illustrated in Figure 1 will operate satisfactorily if the alternating voltage of input circuit 12 is substantially constant.

Figure 3:
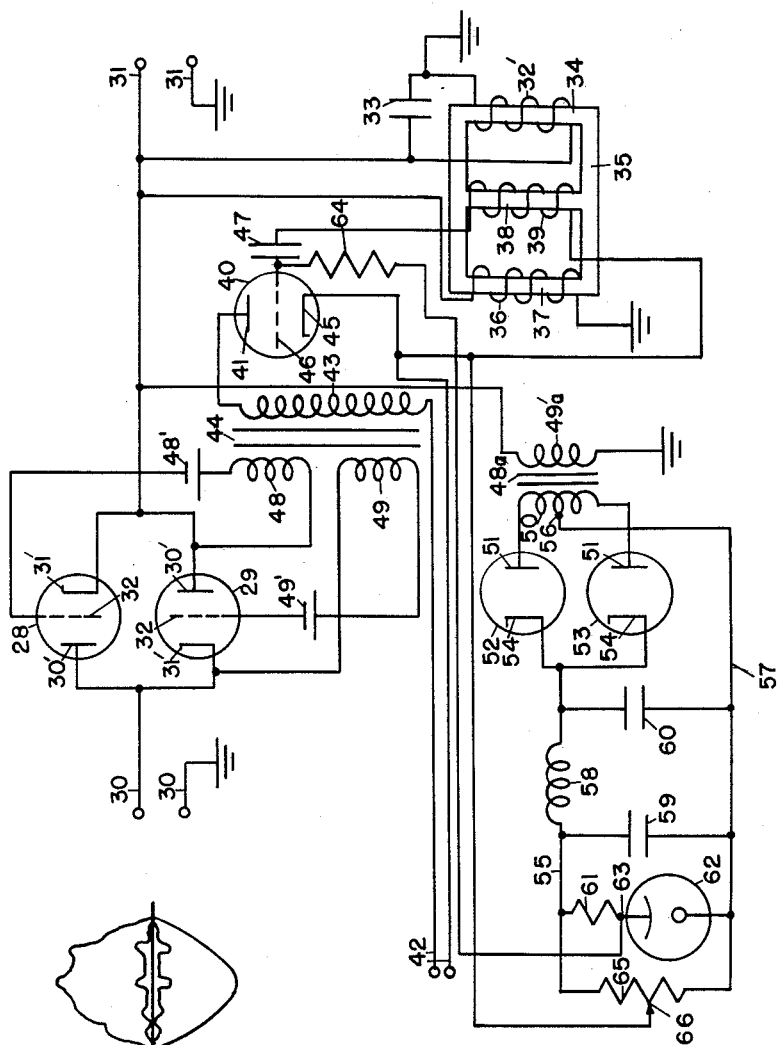
Figure 3 is a diagrammatic illustration of a modified form of the invention illustrated in Figure 1; and, Figure 4 is a diagrammatic illustration of another modified form of the invention illustrated in Figure 1.

Referring now to Figure 3 which illustrates a modification of the device shown in Figure 1, a pair of electric discharge devices 28 and 29 are connected reversely in parallel between an alternating current input circuit 30 and an alternating current output circuit 31. Each of the electric discharge devices 28 and 29 is provided with an anode 30', a cathode 31' and a control grid 32. Anode 30' of electric discharge device 28 and cathode 31' of electric discharge device 29 are connected to one side of input circuit 30 while anode 30' of electric discharge device 29 and cathode 31' of electric discharge device 28 are connected to one side of output circuit 31. The other sides of input circuit 30 and output circuit 31 are connected through ground.

In order to provide an alternating potential of substantially sine wave form which has the same frequency and the proper phase relationship with respect to the alternating voltage of input circuit 30, I provide a resonant circuit comprising a primary winding 32' connected in parallel with a capacitor 33 across output circuit 31. Primary winding 32' is wound about one leg 34 of a three-legged core which has another primary winding 36 connected across output circuit 13 and wound about the leg 37. Primary windings 32' and 37 are so wound that they induce alternating fluxes in the middle leg 38 which are of tendency to induce alternating voltages of opposite polarities in the secondary winding 39 wound about leg 38. The voltage induced in secondary winding 39 varies, therefore, as the difference in the voltages of windings 32' and 36.

In order to amplify the voltage induced in secondary winding 39, I provide an electric discharge device 40 having an anode 41 connected to one side of a direct current supply circuit 42 through the primary winding 43 of a transformer 44, a cathode 45 connected to the other side of direct current supply circuit 42 and also to one side of secondary winding 39, and a control grid 47 connected to the other side of secondary winding 39 through a blocking capacitor 47.

The mode of operation of the embodiment of my invention illustrated in Figure 3 is similar to that of the embodiment illustrated in Figure 1. It will be noted that the voltage of the output circuit 31, and not of the input circuit 30, is compared with the sine wave form voltage of winding 32'. The variation from sine wave form of the voltage of output circuit 31 being very small, it is necessary to amplify the variation in order to obtain the required control potentials on control grids 32 of electric discharge devices 28 and 29. Secondary windings 48 and 49 of transformer 44 are connected to control grids 32 to impress alternating potentials of opposite polarities on control grids 32 in order that both half cycles of the alternating current of input circuit 30 be transmitted to output circuit 31. Bias batteries 48' and 49' are connected in series with the grids 32 to provide proper operating bias.

The circuit of Figure 3 may also be provided with a circuit for impressing a bias potential on control grid 46 which varies in accordance with the voltage of output circuit 31 to maintain the R. M. S. of the output voltage substantially constant. The voltage regulating circuit comprises a voltage sensing transformer 48A having a primary winding 49A connected across the output circuit 31 and a secondary winding 50. The opposite ends of secondary winding 50 are connected to the anodes 51 of a pair of electric discharge devices 52 and 53 whose cathodes 54 are connected to form one side of a direct current circuit. The electric midpoint 56 of secondary winding 50 is connected to a conductor 57 which forms the other side of the direct current circuit energized from secondary winding 50. A filter comprising an inductance 58 and capacitors 59 and 60 is employed to smooth out the pulsating direct current transmitted to a conductor 55 by electric discharge devices 52 and 53. A voltage divider bridge comprising a resistance 61 and a glow discharge means 62, which acts as a voltage regulator, is connected across conductors 55 and 57. The common connection 63 of glow discharge means 62 and resistance 61 is connected to control grid 46 through a current limiting resistance 64 while the adjustable control 65 on a resistance 66 which is connected across conductors 55 and 57, is connected to cathode 45.

The mode of operation of the voltage regulating circuit will be apparent to those skilled in the art. Briefly, if the voltage of output circuit 31 varies, the conductivity of electric discharge device 40 will also vary. For example, if the R. M. S. voltage of output circuit 31 tends to increase from a predetermined value, the direct current voltage across conductors 55 and 57 will also tend to increase. The potential impressed on cathode 45 through the contact 65 on resistance 66 will therefore tend to increase. Since the control grid 46 is connected to common connection 63, its potential, due to the voltage regulating action of glow discharge means 62, remains unchanged. This causes the control grid 46 to be more negative with respect to cathode 46, and less current will be transmitted to primary winding 43 causing the potentials impressed on the control grids 32 of the electric discharge devices 28 and 29 to be less positive during the alternate half cycles during which these devices transmit current. The less positive potentials on control grids 32 tend to decrease the current transmitted by electric discharge devices 28 and 29 and lower the voltage of output circuit 31 to the predetermined value. Conversely, if the voltage of output circuit 31 tends to decrease from the predetermined value, more positive potentials are impressed on control grids 32 during the half cycles during which electric discharge devices 28 and 29 are conductive and more current is transmitted to output circuit 31 whereby the voltage of output circuit 31 tends to increase to the predetermined value. In this manner the R. M. S. voltage of output circuit 31 is maintained substantially constant.

Figure 4:
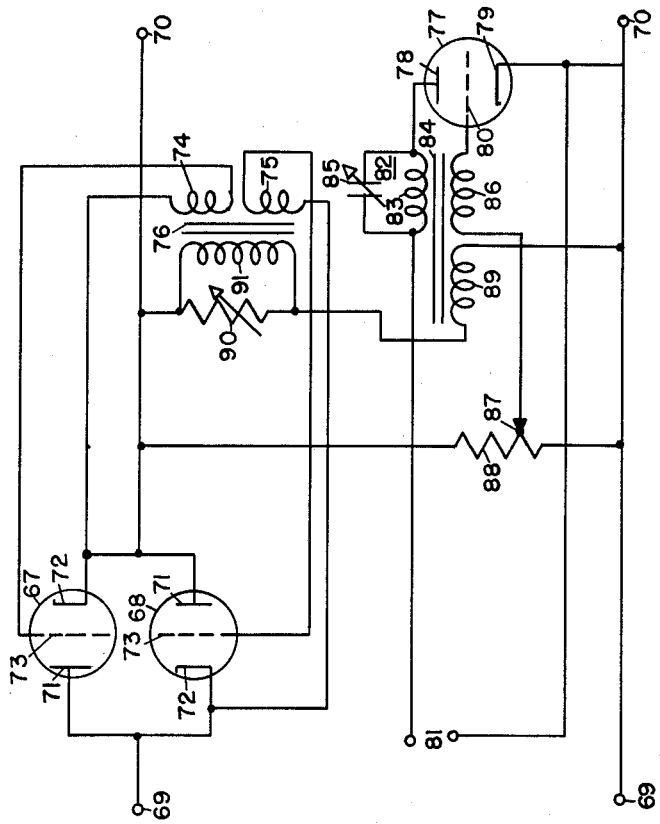

Referring now to Figure 4 of the drawing, the modified embodiment of my invention there illustrated comprises a pair of electric discharge devices 67 and 68 reversely connected in parallel between an alternating current input circuit 69 and an alternating current output circuit 70. Each of the electric discharge devices 67 and 68 comprises an anode 71, a cathode 72 and a control grid 73. Alternating potentials of opposite polarities are impressed on the control grids 73 by secondary windings 74 and 75 of a transformer 76. In order to induce alternating potentials in windings 74 and 75 which vary in accordance with the departure of the wave form of the alternating voltage of output circuit 70 from sine wave form, I provide an oscillator comprising an electric discharge device 77 having an anode 78, a cathode 79 and a control grid 80. Anode 78 is connected to one side of a direct current supply circuit 81 through a resonant circuit 82 which comprises a winding 83 of a transformer 84 and a capacitor 85 connected across winding 83. Cathode 79 is connected to the other side of direct current circuit 81 while control grid 80 is connected through another winding 86 of transformer 84 and an adjustable control 87 to a resistance 88 connected across output circuit 70. Transformer 84 is provided with still another winding 89 which is connected in series with a resistance 90 across output circuit 70. The primary winding 91 of transformer 76 is connected across resistance 90.

In operation, electric discharge device 77 oscillates at the same frequency as the alternating voltage of output circuit 70 since its control grid 80 is connected to resistance 88. The potential impressed on control grid 80 by the alternating voltage of output circuit 70 is set by adjustment of adjustable contact 87 at as low a value as possible since the wave form of output circuit 70 will necessarily deviate slightly from sine wave form. The current flowing in winding 83 of resonant circuit 82, which is the tuned to frequency of the alternating voltage of output circuit 70, induces a sine wave potential in winding 86 which is also impressed on control grid 80. The latter potential is made of as high a value as possible since it is of sine wave form. It will be noted that the resultant potential, the algebraic sum of the two potentials, impressed on control grid 80 will deviate slightly from sine wave form. However, this deviation is made exceedingly small since the potential induced in winding 86 by the current in winding 83 is of relatively high value compared to the potential at adjustable contact 87. Furthermore, the deviation from sine wave form of the alternating potential at adjustable contact 87 will be quite small since resistance 88 is connected across the output circuit 70 whose voltage wave form is of almost sine wave shape.

The current in winding 89 which is of substantially sine wave form and which tends to force current to flow through resistance 90 in one direction when the voltage of output circuit 70 is tending to force current to flow through resistance 90 in the opposite direction. As a result, the voltage across resistance 90 varies in accordance with the departure of the voltage of output circuit 70 from sine wave form.

Voltages of opposite polarities which vary in like manner are thus induced in secondary windings 74 and 75 since primary winding 91 is connected across resistance 90. As a result, potentials are impressed on control grids 73 which cause the current transmitted to output circuit 31 to be of substantially sine wave form.

While the above described embodiments of my invention illustrate various means for comparing a sine wave form potential with a potential having the same wave form as the voltage of an alternating current circuit in order to make the wave form of the voltage of the alternating current circuit be of sine wave form, it will be obvious that square wave form, or any other predetermined wave form, may be so compared to make the voltage of the alternating current circuit be of the predetermined wave form.

While I have shown particular embodiments of my invention, it will be apparent to those skilled in the art that various changes and modifications can be made without departing from my invention and I, therefore, aim in the appended claims to cover all such changes and modifications as fall within the true spirit and scope of my invention.

What I claim as new and desire to secure by Letters Patent of the United States is:

1. In combination: an alternating current input circuit; an output circuit; a pair of electric discharge devices reversely connected in parallel between said circuits to transmit energy from said input circuit to said output circuit, each of said electric discharge devices having a control member, the conductivity of each of said electric discharge devices varying in accordance with the potential impressed on its control member; a transformer having two secondary windings and a primary winding, each of said secondary windings being connected to one of said control grids for impressing alternating potentials of opposite polarities on said control grids; a pair of resistances connected in series across said primary winding, one of said resistances being connected across said input circuit; and means connected across said output circuit and operatively associated with the other of said pair of resistances for impressing an alternating potential of predetermined wave form across the other of said pair of resistances.

2. In combination: an alternating current input circuit; an output circuit; a pair of electric discharge devices reversely connected in parallel between said circuits to transmit energy from said input circuit to said output circuit, each of said electric discharge devices having a control member, the conductivity of each of said electric discharge devices varying in accordance with the potential impressed on its control member; means for producing an alternating voltage of predetermined wave form; means operatively associated with said input circuit and said last mentioned means for producing an alternating potential which varies in accordance with the departure of the wave form of the voltage of said input circuit from said predetermined wave form; and means connected to said control grids and operatively associated with said producing means for impressing on one of said control grids an alternating potential of the same wave form as the alternating potential produced by said producing means; and means for impressing on the other of said control grids an alternating potential of the same wave form as that impressed on said one of said control grids but of opposite polarity.

3. In combination: an alternating current input circuit; an output circuit; a pair of electric discharge devices reversely connected in parallel between said circuits to transmit energy from said input circuit to said output circuit, each of said electric discharge devices having a control member, the conductivity of each of said electric discharge devices varying in accordance with the potential impressed on its control member; means for producing an alternating voltage of sine wave form; means operatively associated with said input circuit and said last mentioned means for producing an alternating potential which varies in accordance with the departure of the wave form of the voltage of said input circuit from sine wave form; and means connected to said control members and operatively associated with said producing means for impressing on one of said control members an alternating potential of the same wave form as said first mentioned alternating potential; and means for impressing on the other of said control members an alternating potential of the same wave form as said first mentioned alternating potential but of opposite polarity.

4. In combination: an alternating current input circuit; an output circuit; a pair of electric discharge devices reversely connected in parallel between said circuits to transmit energy from said input circuit to said output circuit, each of said electric discharge devices having a control member, the conductivity of each of said electric discharge devices varying in accordance with the potential impressed on its control member; means energized from said output circuit for producing an alternating voltage of predetermined wave form; comparing means operatively associated with said last mentioned means and said input circuit for comparing the wave form of the voltage of said input circuit with said voltage of predetermined wave form and producing an alternating potential which varies in accordance with the difference in said wave forms; and means for impressing on one of said control members an alternating potential of the same wave form of said first mentioned alternating potential; and means operatively associated with said comparing means for impressing on the other of said control members an alternating potential of the same wave form as said first mentioned alternating potential but of opposite polarity.

5. In combination: an alternating current input circuit; an output circuit; a pair of electric discharge devices reversely connected in parallel between said circuits to transmit energy from said input circuit to said output circuit; each of said electric discharge devices having a control member, the conductivity of each of said electric discharge devices varying in accordance with the potential impressed on its control member; means energized from said output circuit for producing an alternating voltage of sine wave form; comparing means operatively associated with said last mentioned means and said input circuit for comparing the wave form of the voltage of said input circuit with said voltage of sine wave form and producing an alternating potential which varies in accordance with the difference in said wave forms; and means operatively associated with said comparing means for impressing on one of said control members an alternating potential of the same wave form as said first mentioned alternating potential impressing on the other of said control members an alternating potential of the same wave form as said first mentioned alternating potential but of opposite polarity.

6. In combination: an alternating current input circuit; an output circuit; a pair of electric discharge devices reversely connected in parallel between said circuits to transmit energy from said input circuit to said output circuit, each of said electric discharge devices having a control member; means energized from said output circuit for producing an alternating voltage of sine wave form; comparing means operatively associated with said last mentioned means for comparing the wave form of the voltage of said output circuit with said sine wave form voltage and producing an alternating potential which varies in accordance with the difference in said wave forms; means for amplifying said alternating potential; and means operatively associated with said amplifying means for impressing on one of said control members an alternating potential of the same wave form as said first mentioned alternating potential and for impressing on the other of said control members an alternating potential of the same wave form as said first mentioned alternating potential but of opposite polarity.

7. The device of claim 6 in which said comparing means comprises a magnetic core, a first winding on said core, said first winding being connected across said output circuit; a second winding on said core connected across said output circuit, a capacitor connected across said second winding to form a resonant circuit of the same frequency as said voltage of said output circuit, and a third winding disposed on said core and connected to said amplifying means, the alternating currents in said first and second windings tending to induce alternating potentials of opposite polarities in said third winding.

8. In combination: an alternating current input circuit; an output circuit; a pair of electric discharge devices reversely connected in parallel between said circuits to transmit energy from said input circuit to said output circuit, each of said electric discharge devices having a control member; an oscillator operatively associated with said output circuit for producing an alternating voltage of substantially sine wave form; comparing means operatively associated with said last mentioned means for comparing the wave form of the voltage of said output circuit with the wave form of the alternating voltage produced by said oscillator and producing an alternating potential which varies in accordance with the difference in said wave forms; and means operatively associated with said comparing means for impressing on one of said control members an alternating potential of the same wave form as said first mentioned potential and for impressing on the other of said control members an alternating potential of the same wave form as said first mentioned alternating potential but of opposite polarity.

9. In combination: an alternating current input circuit; an output circuit; a pair of electric discharge devices reversely connected in parallel between said circuits to transmit energy from said input circuit to said output circuit, each of said electric discharge devices having a control member; an oscillator including a third electric discharge device having an anode, a cathode and a control member and means operatively associated with said second mentioned control member and said anode for impressing a regenerative substantially sine wave form potential on said control grid; means operatively associated with said last mentioned means and with said output circuit for impressing a synchronizing alternating potential on said second mentioned control member; and comparing means operatively associated with said means for impressing a substantially sine wave form potential and said output circuit for comparing the wave form of said sine wave form potential with the wave form of the voltage of said output circuit and for producing an alternating voltage which varies in accordance with the departure of the wave form of the voltage of said output circuit voltage from sine wave form; and means operatively associated with said comparing means for impressing on said control members of one of said pair of electric discharge devices a potential of the same wave form as said alternating voltage which varies in accordance with the departure of the wave form of said output circuit voltage from sine wave form and for impressing on the control member of the other of said pair of electric discharge devices an alternating potential of the same wave form as said last mentioned alternating potential but of opposite polarity.

References Cited in the file of this patent

UNITED STATES PATENTS

| 2,175,009 | Anderson | Oct. 3, 1939 |
| 2,250,202 | Matusita | July 22, 1941 |
| 2,436,890 | Higinbotham | Mar. 2, 1948 |
| 2,445,773 | Frost | July 27, 1948 |
| 2,461,637 | Germany | Feb. 15, 1949 |
| 2,480,125 | Field | Aug. 30, 1949 |
| 2,493,772 | McCoy et al. | Jan. 10, 1950 |

FOREIGN PATENTS

| 519,481 | Great Britain | Mar. 28, 1940 |